Figure 1:
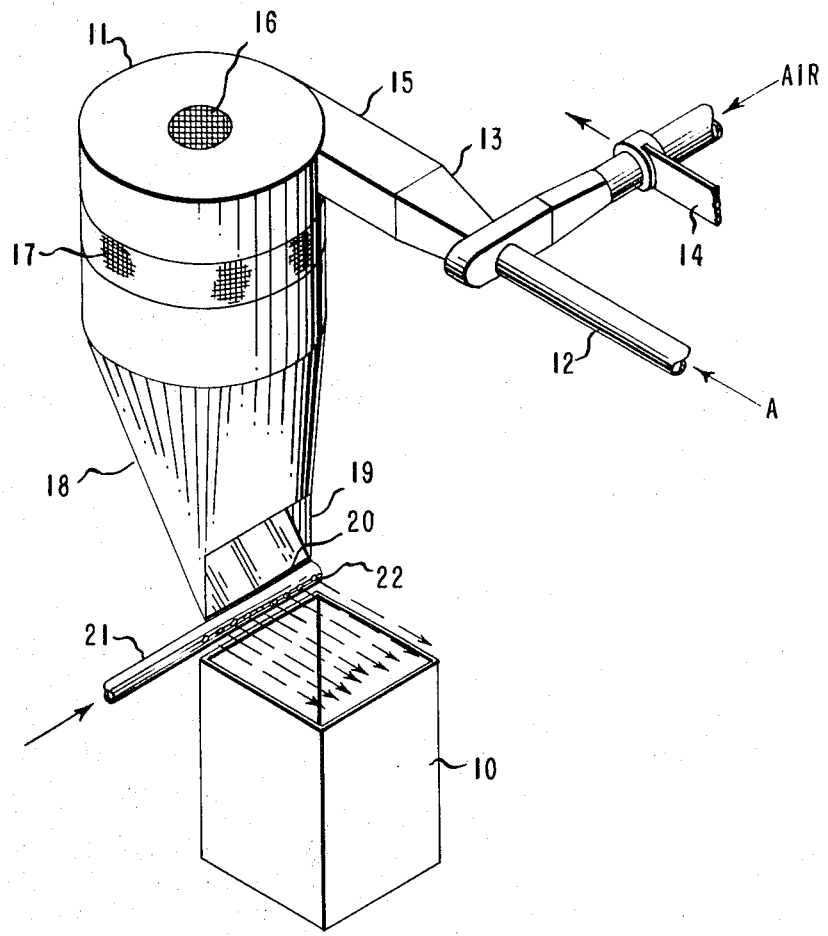

United States Patent [19]
O'Neill

[11] 3,765,324
[45] Oct. 16, 1973

[54] APPARATUS FOR BALING FIBERS

[75] Inventor: Joseph Thomas O'Neill, Brockville, Ontario, Canada

[73] Assignee: Du Pont of Canada, Limited, Montreal, Quebec, Canada

[22] Filed: June 14, 1971

[21] Appl. No.: 152,724

[52] U.S. Cl. ............................ 100/215, 100/220
[51] Int. Cl. ........................................ B30b 15/30
[58] Field of Search.................. 100/35, 215, 220, 100/99, 45, 70–75, 90; 141/67; 214/17 C; 222/.56

[56] References Cited
UNITED STATES PATENTS
3,583,312  6/1971  Van Doorn et al.................. 100/90
3,025,785  3/1962  Deems................................. 100/90
2,488,395  11/1949  Goldberg........................ 100/90 UX
862,231  8/1907  Bates................................ 100/90 UX Primary Examiner—Billy J. Wilhite
Attorney—J. R. McGrath

[57] ABSTRACT

An apparatus for baling staple fibers, wherein the fibers are held up in a chute above a bale press box while a tamper compresses layers of fiber already in the box. When the tamper is raised, staple fibers drop from the chute and are subjected to horizontally directed fluid forces which distribute the added fibers in a uniform layer in the box. The resulting bales have relatively uniform dimensions, even density throughout and increased overall weight.

3 Claims, 2 Drawing Figures

APPARATUS FOR BALING FIBERS

This invention relates generally to an improved apparatus for baling staple fibers to obtain bales having relatively uniform dimensions, even density throughout and increased overall weight.

In a known apparatus for producing man-made staple fibers, continuous filaments are crimped, then cut to staple length and the staple fibers so produced are conveyed by an air stream to a cyclone separator mounted above a bale press box. The air is separated from the staple fibers in the cyclone and the fibers drop down a chute to a lift gate above the bale press box. A hydraulic ram or tamper in the bale press box is raised and this action opens the gate allowing staple fibers to fall into the bale press box. The staple fibers fall out of the chute into the bale press box. In some instances, they do not fall into the box in a uniformly distributed pattern but tend to accumulate on the chute side of the box. The lift gate closes as the tamper comes down and exerts a pressure on the staple fibers to compress them into a layer. If there is an uneven distribution of the staple fibers throughout each layer, a build-up occurs on one side and uneven bale formation occurs.

Such uneven bale formation can cause a number of problems. For instance, it contributes to an uneven pressure on the tamper and the resulting unbalanced forces may cause twist or distortion in the baler frame. It also causes uneven pressures on catches provided at the top of the bale press box to stop the layers of fibers springing back up when the tamper lifts. Furthermore, the press table supporting the bale press box may be subjected to uneven pressures thus causing the table to twist or distort. Another problem may be caused by uneven tensions in the wire or strapping which holds the bale together. Also, the bale itself when finished is not rectangular or square in shape and, furthermore, the bales are not consistent in weight from one to the other. The bale instead of having relatively flat surfaces, as is desired, may often have one or more surfaces which bulge in the middle or which bulge or protrude more on one end than the other. This may result in further problems when the bales are stacked.

The difficulties noted above have been overcome by subjecting fibers to fluid flowing substantially horizontally across their downward path to a bale box so as to spread the fibers uniformly in successive layers. The improved apparatus includes a bale press box, a chute mounted above and to one side of the bale press box for directing a flow of fibers into the box, a lift gate at the end of the chute, a tamper located above the bale press box, means for lowering and raising the tamper at predetermined time intervals to compress layers of fibers in the bale press box, means for raising the lift gate in conjunction with the tamper, and a perforated duct located below the end of the chute and above the bale press box for ejecting fluid streams horizontally across the top of the bale press box when the lift gate is in the raised position and thereby directing the flow of fibers to a uniform layer in the bale press box.

THE DRAWINGS

Figure 2:
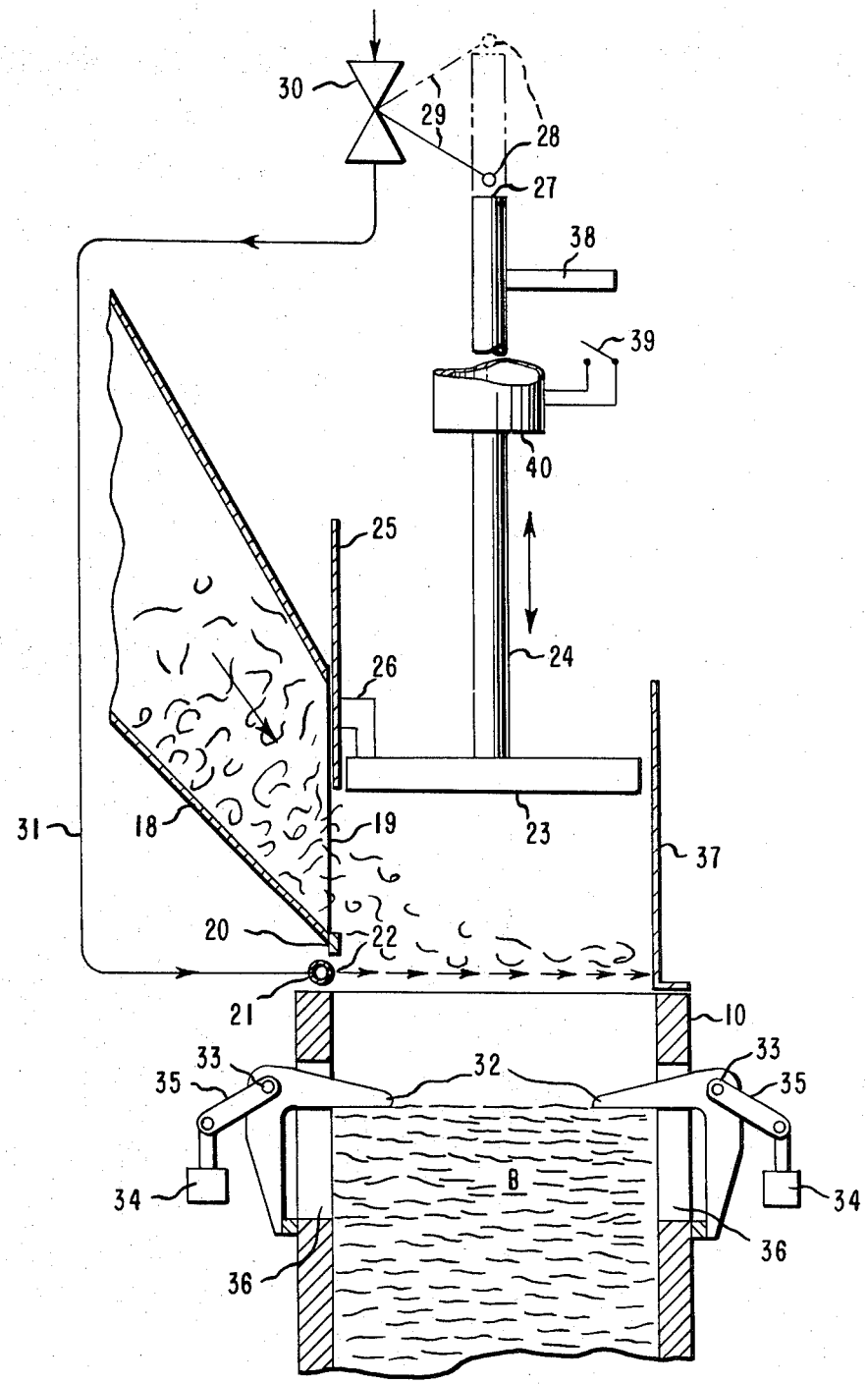

FIG. 1 is a fragmentary perspective view showing one embodiment of apparatus for conveying staple fibers to a bale press box, and FIG. 2 is a side elevation, partly diagrammatic and partly in section, of the apparatus of the present invention.

Referring now to FIG. 1, a bale press box 10 is shown located beneath a cyclone separator 11. Staple fibers A are conveyed in a fluid medium, preferably air, through a pipe 12. The fibers pass through a venturi 13 where air from a fan or blower is supplied through a control valve 14. The air is blown into the venturi 13 and produces a negative pressure in pipe 12. This negative pressure pulls the staple fibers into the venturi, whence the air blows the fibers through a rectangular duct 15 and into the cyclone separator 11. In the cyclone separator 11, the air and staple fibers are separated, the air passing out through top and side air escapes 16, 17 in the cyclone separator 11. The fibers drop spirally into a chute 18 where they are directed in a downward path from its lower end 19 into the bale press box 10. The evenness of the flow of fibers across the chute lip 20 may be controlled by the air supply control valve 14. By varying the air flow, the number of spiral turns the fibers make before descending to the end of the chute may be varied and the optimum air flow determined. Just beneath and substantially parallel to the chute lip 20 is an air duct 21. This air duct 21 has holes 22, spaced evenly apart along the duct, the holes 22 pointing in a horizontal direction across the top of the bale press box 10. As illustrated, lip 20, duct 21 and an upper edge of box 10 are in substantial parallelism. Whereas holes 22 are shown in the duct 21 in the present embodiment, it will be apparent to those skilled in the art that these holes could be replaced with a slit or section of sintered or porous metal. The important point is that the staple fibers are subjected to fluid flowing substantially horizontally across their path to spread them evenly in the bale press box. Preferably, the fluid is a plurality of streams of air emanating from holes 22 in duct 21.

The baling apparatus shown in FIG. 2 includes the bale press box 10, the chute 18 having its open end 19 and lip 20 above one side of the bale press box 10, and the air duct 21 located below and parallel to the chute lip 20 just above the bale press box 10. A tamper 23 is raised and lowered on a shaft 24 of a double-acting hydraulic cylinder 40 and compresses the staple fibers B accumulated in the bale press box 10. A lift gate 25 is located over the end 19 of the chute 18. This lift gate 25 has a lug 26 which extends into the path of the tamper 23. Thus, when the tamper 23 is raised, it contacts lug 26 and opens the lift gate 25. When the tamper 23 is lowered, the lift gate 25 falls with the down stroke of the tamper until, in the closed position, it rests on the chute lip 20.

At the top 27 of the tamper shaft 24 is a cam 28 on an extension arm 29. As the shaft 24 raises the tamper 23, the end 27 of the tamper shaft 24 raises the cam 28 and the extension arm 29 operates a valve 30. This valve 30 opens and allows a blast of compressed air to pass through a conduit 31 to the duct 21 and out through the holes 22 across the open top of the bale press box 10.

Catches or dogs 32 are located on two opposing sides of the bale press box 10. These catches are L-shaped and have a pivot point 33 just outside the box 10. A counterweight 34 supported on arm 35 holds the catches 32 with one segment of the catch extending horizontally across the bale press box 10. When the catches are in the open position, this segment of the catch is retained in a slot 36 in the sides of the bale press box 10.

In operation, staple fibers A are conveyed into the cyclone separator 11 by the fluid stream in duct 15. The flow may be varied according to the means of feeding the staple fibers into the conveying system. The fibers separate from the air in the cyclone 11, the air escaping through top and side air outlets 16, 17 and the fibers drop spirally down the chute 18. Some adjustment is necessary to the air supply control valve 14 to ensure that the fibers are evenly distributed across the chute lip 20. The fibers come to rest against the lift gate 25 which normally closes the open end 19 of the chute 18. As the tamper 23 rises periodically, it contacts the lug 26 and raises the lift gate 25. At a predetermined time, the end 27 of the tamper shaft 24 contacts the cam 28 and the extension arm 29 rotates, opening the valve 30. Compressed air passes through the valve 30, the conduit 31 and the duct 21 and flows out in jets or streams through the holes 22 equally spaced and directed across the open top of the bale press box 10. The staple fibers fall from and are directed in a downward path by the end 19 of the chute 18 into the streams of air flowing from the holes 22 in the duct 21. Some fibers fall directly and others are carried across bale press box 10 so that an even layer of fibers is formed in the box. It is found that the flow and pressure of air from the holes 22 in the duct 21 are not critical, although too high a pressure and too high a flow will cause turbulence and will not form an even blanket or even layer across the surface of the bale press box. A guard 37 mounted on the opposite side of the bale press box from the chute 18 stops the staple fibers from being blown beyond the bale press box. After a predetermined lag time, the tamper 23 commences to lower responsive to the action of cylinder 40. The cam 28 follows the shaft end 27 and the air valve 30 closes. Also, the lug 26 resting on the tamper 23 follows the tamper 23 and the lift gate 25 lowers until it rests on the lip 20 closing the end 19 of the chute 18. The tamper 23 then continues downwards, pushes the horizontal segment of the catches 32 downwards and into the slots 36 and compresses the staple fibers B in the bale press box 10. At the same time, more staple fibers fall from the cyclone separator 11 and accumulate in the chute 18 behind the lift gate 25. The tamper 23 then commences to raise and the counterweights 34 force the catches 32 to follow the tamper 23 until one segment is horizontal. These catches hold the pressure on the layers of fibers as they accumulate and stop the fibers rising up in the bale press box 10. The process is then repeated until the depth of the layers in press box 10 is such that a laterally extending arm 38 on shaft 24 does not reach a limit switch 39 (FIG. 2). At that time, a bell rings to warn the operator and tamper 23 comes to rest just above press box 10.

EXAMPLE

An air duct was installed on a feed system for a baling device similar to that shown in FIGS. 1 and 2. The duct consisted of a copper line ½ inch in diameter with ⅛ inch holes spaced approximately 2 inches apart. The duct was installed below the lip of the chute with the holes positioned to direct streams of air across the top of the bale press box. The air control valve was adjusted so the streams of air from the duct commenced to flow when the lift gate had exposed about 12 inches of the end of the chute. Some adjustments were necessary to ensure the flow of air through the duct was optimum for obtaining an even layer of Orlon acrylic fibers in the bale press box. The fibers had previously been crimped in a stuffer box and cut to a nominal length of 1½ inches. Flow of air to the venturi in the staple fiber conveying pipe was adjusted to ensure an even distribution of staple fibers across the face of the chute.

Bales having even density throughout and relatively flat sides were produced on this system and it was found that bales weighing 650 ± 50 pounds could be obtained. Without this improvement, it had only been possible to produce uniform bales weighing up to 480 ± 50 pounds. With an even bale, it was found that the catches, provided at the top of the bale press box to stop the fibers springing back up, all received comparatively even loads whereas, without this system, higher loads occurred on the catches on the same side as the chute and these catches sometimes broke off. Ease was also experienced in tying the full bales with link wires, as it was found that the tensions in all the wires were approximately the same. It was also found that the resulting square bales were easier to stack as compared to the previous uneven bales which often formed a crooked stack.

What is claimed is:

1. In a baling apparatus including a bale press box, a chute mounted above and to one side of the bale press box for directing staple fibers into the box, a lift gate at the end of the chute, a tamper located above the bale press box, means for lowering and raising the tamper to compress layers of fibers in the bale press box, and means for raising the lift gate in conjunction with upward movement of the tamper, the improvement comprising:

a duct located below and substantially parallel to the end of the chute, above the bale press box, and means for ejecting a plurality of fluid streams from the duct horizontally across the top of the bale press box in conjunction with upward movement of the tamper, whereby to direct the flow of fibers to fall in a uniform layer in the bale press box.

2. In a baling apparatus including a bale press box, a chute mounted above and to one side of the bale press box for directing staple fibers into the box, a tamper located above the bale press box, means for lowering and raising the tamper at predetermined time intervals to compress layers of fibers in the bale press box, and a lift gate at the end of the chute adapted to open the chute and allow a flow of fibers into the box in conjunction with the raising of the tamper, the improvement comprising:

a duct located below and substantially parallel to the end of the chute above the bale press box, said duct having a plurality of holes directed horizontally across the box, and valve means adapted to be opened in conjunction with the raising of the tamper and whereby fluid is allowed to enter the duct, eject through the holes and spread the fibers in a uniform layer in the bale press box.

3. In a baling apparatus including a bale press box, a tamper movable into and out of the box, a delivery chute with a lower lip and a lift gate movable to an open position in response to movement of the tamper out of the box, the improvement comprising provision of a perforated duct above one side of the press box and a valved conduit for delivering fluid to said duct when the gate is open, said duct being located below and substantially parallel to said lip.

* * * * *